US00RE37147E

(19) United States
(12) Reissued Patent
Svensson

(10) Patent Number: US RE37,147 E
(45) Date of Reissued Patent: Apr. 24, 2001

(54) METHOD FOR HEATING AND SUBSEQUENTLY SUPPORTING OR DISPLAYING FOOD

(75) Inventor: S. Alfred Svensson, Cincinnati, OH (US)

(73) Assignee: Falcon Fabricators, Inc., Batavia, OH (US)

(21) Appl. No.: 09/325,435

(22) Filed: Jun. 3, 1999

Related U.S. Patent Documents

Reissue of:
(64) Patent No.: 5,635,234
Issued: Jun. 3, 1997
Appl. No.: 09/667,506
Filed: Jun. 21, 1996

U.S. Applications:

(62) Division of application No. 08/214,144, filed on Mar. 16, 1994, now abandoned.

(51) Int. Cl.[7] ..... A23L 1/00
(52) U.S. Cl. ..... 426/438; 426/523
(58) Field of Search ..... 426/438, 439, 426/510, 511, 523, 506; 220/485; 126/369; 99/417, 448

(56) References Cited

U.S. PATENT DOCUMENTS

| | | | | |
|---|---|---|---|---|
| 3,484,252 | | 12/1969 | Popeil | 99/100 |
| 3,939,980 | | 2/1976 | King | 206/507 |
| 3,979,856 | | 9/1976 | Belcher | 47/37 |
| 4,300,686 | | 11/1981 | Leclerc et al. | 206/506 |
| 5,243,898 | * | 9/1993 | Sakuma | 426/438 |
| 5,635,234 | | 6/1997 | Svensson | 426/438 |

* cited by examiner

*Primary Examiner*—George C. Yeung
(74) *Attorney, Agent, or Firm*—Wood, Herron & Evans, LLP

(57) ABSTRACT

[An improved wire rack for supporting food such as chicken in a Henny Penny pressure fryer and subsequently displaying the fried food in either a single bunn pan or a double bunn pan. The improved rack is capable of being used in all three environments (fryer, single plan and double pan) largely because it has a lower rectangular peripheral edge with a shorter length and width relative to the length and width of the upper rectangular peripheral edge.] *A method of heating and subsequently supporting or displaying food, according to the principles of the invention, includes the steps of: placing the food on a wire rack, (the wire rack including: a rectangular frame having a lower border rod and an upper border rod, the lower border rod defining a lower rectangular peripheral edge having a length and a width, and the upper border rod defining an upper rectangular peripheral edge having a length and a width, the upper rectangular peripheral edge having a larger circumference than the lower rectangular peripheral edge, thereby enabling the wire rack to be positioned respectively, in a stable, uncocked position, in a heating device and as a sole rack in a single rack bun pan and as one of a pair of the wire racks in a double rack bun pan, the rectangular frame further including tapered sides between the upper rectangular peripheral edge and the lower rectangular peripheral edge; and a number of support members in the form of a number of wires extending between and attached to opposed sides of the lower border rod so as to create a support surface for the food); positioning the wire rack in a heating device, heating the food in the heating device; removing the wire rack and heated food from the heating device; and placing the wire rack in one of a single rack bun pan and a double rack bun pan, thereby subsequently supporting the food and, if desired, displaying the food.*

10 Claims, 2 Drawing Sheets

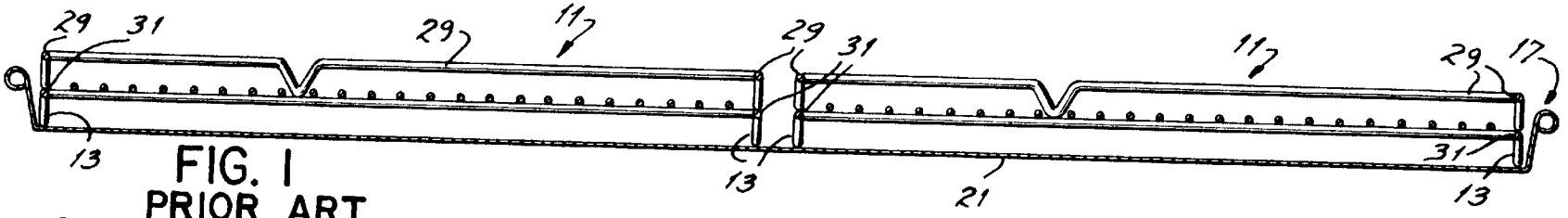
FIG. 1
PRIOR ART
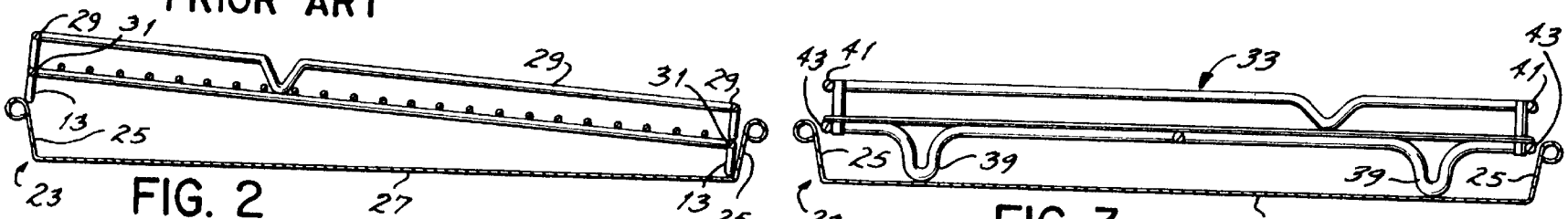
FIG. 3
PRIOR ART
FIG. 2
PRIOR ART
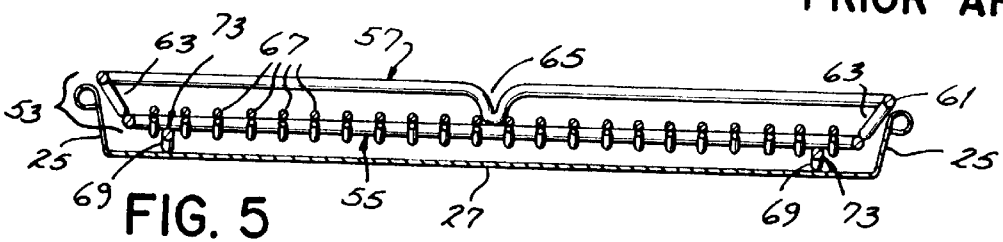
FIG. 5
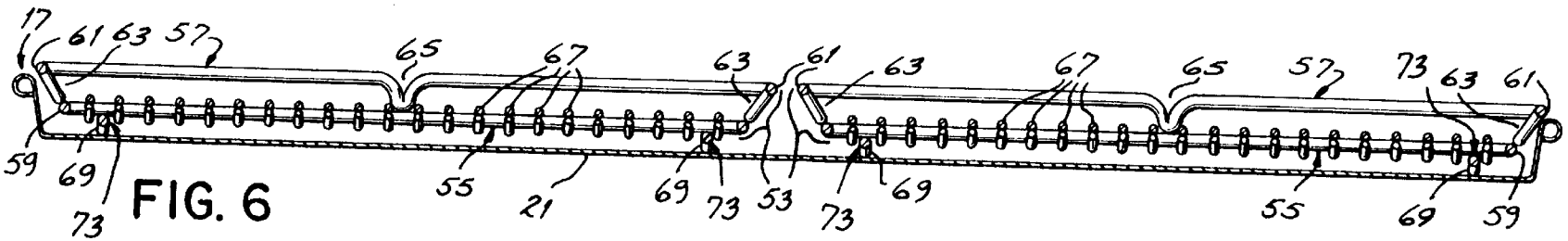
FIG. 6

METHOD FOR HEATING AND SUBSEQUENTLY SUPPORTING OR DISPLAYING FOOD

Matter enclosed in heavy brackets [ ] appears in the original patent but forms no part of this reissue specification; matter printed in italics indicates the additions made by reissue.

This [application] *application is an application for reissue of U.S. Pat. No. 5,635,234, which* is a divisional of [application Ser.] *Application* No. 08/214,144, filed on Mar. 16, 1994 and entitled "Rack For Supporting Food", *now abandoned.*

BACKGROUND OF THE INVENTION

This invention relates to wire racks for supporting food, and more particularly to an improved wire rack for supporting food such as fried chicken in a pressure fryer and subsequently supporting [and] *or* displaying that food in a single rack bun pan or a double rack [bunn] *bun* pan.

In the fried chicken industry, as in many other food service industries, the food is prepared in several stages including a frying stage and a display stage. In the frying stage, pieces of chicken are placed on wire racks which are subsequently placed in high pressure fryers. One of the most popular fryers used in the industry is the pressure fryer made by Henny Penny. In the display stage, the rack supporting the fried chicken is removed from the pressure fryer and taken to the display area, where customers are able to view the fried chicken. Ideally, the rack supporting the fried chicken is placed directly into a single rack [bunn] *bun* pan or double rack [bunn] *bun* pan. However, this is often not possible because the racks required for the popular Henny Penny pressure fryer do not fit in all [bunn] *bun* pans. Although the racks required for Henny Penny fryers (hereinafter Henny Penny racks) are capable of fitting side by side in a double rack [bunn] *bun* pan, a Henny Penny rack will not fit into a single [bunn] *rack bun* pan.

The incompatibility of the Henny Penny rack with the single [bunn] *rack bun* pan creates several problems. For example, businesses using the popular Henny Penny fryer system must stock an additional inventory of racks just for *subsequently supporting or* displaying chicken in the single [bunn] *bun* pans, which results in increased inventory costs. Furthermore, instead of placing the Henny Penny rack loaded with fried chicken directly into the [bunn] *bun* pan, a production crew member must transfer each piece of chicken from the Henny Penny rack to the separate *support or* display rack. This added step of transferring chicken from one rack to another results in increased labor time, which may be significant when one considers the volume of chicken being prepared.

Therefore, it is desirable to have a rack that may be used in the Henny Penny fryer system as well as *in* both a single rack [bunn] *bun* pan and double rack [bunn] *bun* pan.

SUMMARY OF THE INVENTION

It is an object of the present invention to provide an improved wire rack capable of fitting into the Henny Penny or similar fryer system.

It is a further object of the invention that the same improved wire rack fit into both a single rack [bunn] *bun* pan and a double rack [bunn] *bun* pan.

To these ends, an improved wire rack is provided. The rack has a rectangular frame comprising a lower border rod and an upper border rod, with the lower rod defining a lower rectangular peripheral edge and the upper border rod defining an upper rectangular peripheral edge. The upper rectangular peripheral edge has a larger circumference than the lower rectangular peripheral edge, with means defining tapered side walls between the upper rectangular peripheral edge and the lower rectangular peripheral edge. In the preferred wire rack, the side walls are defined by means comprised of detents which are formed in the upper border rod and extend downwardly to contact with the lower border rod.

The support surface for the food is created largely by a plurality of support members in the form of a plurality of parallel straight wires extending between and attached to opposite sides of the lower border rod.

In order to elevate the support surface, the improved rack further includes legs extending downward from the lower border rod. The legs may be created and positioned in several different ways. For example, in one form of the invention, the legs comprise detents formed in the lengthwise sections of the lower border rod. In another embodiment, the improved rack may have an additional plurality of parallel wires running the length of the rack and extending between and attached to opposed sides of the lower border rod. In this case, the legs are created by forming detents in these additional parallel wires.

One of the advantages of the improved wire rack is that it may be used in the Henny Penny or a similar fryer system as well as both a single rack [bunn] *bun* pan and double rack [bunn] *bun* pan. The improved rack may be used in all three environments largely because the lower border rod has a slightly decreased width and length relative to the upper border rod. Because of this slightly decreased width and length, the lower border rod is able to fit into the single rack [bunn] *bun* pan.

Another advantage of the improved rack is that it is capable of holding essentially the same amount of food as the prior art racks despite the slightly reduced width and length of the lower border rod. This advantage is achieved by having tapered side walls formed between the upper border rod and lower border rod, with the upper border rod having essentially the same width and length as the border rods used in the prior art.

These and other objectives and advantages will become apparent to one skilled in the art from the following detailed description of a preferred embodiment and from the drawings.

BRIEF DESCRIPTION OF DRAWINGS

FIG. 1 is a cross-sectional side view of two racks sitting side by side in a double rack [bunn] *bun* pan. In this view, the racks are displayed along their widths and the pan is displayed along its length.

FIG. 2 is a cross-sectional side view of a rack resting unevenly in a single rack [bunn] *bun* pan. In this view, both the rack and [bunn] *bun* pan are shown along their respective widths.

FIG. 3 is a cross-sectional side view of a standard [display] rack positioned in a single rack [bunn] *bun* pan. Both the rack and pan are displayed along their respective widths.

FIG. 5 is a cross-sectional view of an improved wire rack according to the invention, positioned in a single rack [bunn]

Figure 4:
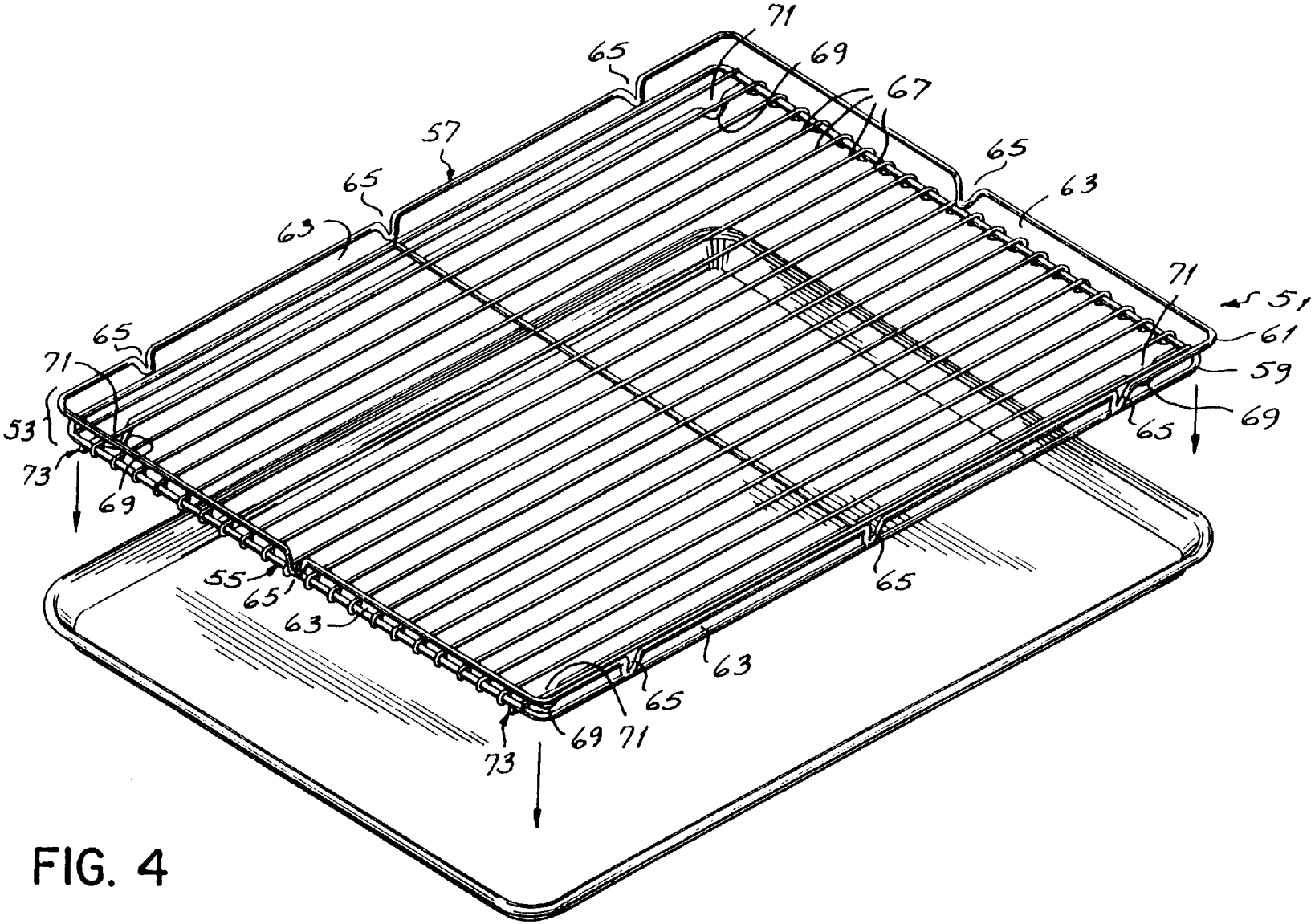
FIG. 4 is a perspective view of an improved wire rack according to the invention, disposed above a single rack [bunn] *bun* pan.

*bun* pan. Both the rack and pan are displayed along their respective widths.

FIG. 6 is a cross-sectional view of two improved wire racks according to the invention situated side by side within a double rack [bunn] *bun* pan. The inventive racks are viewed along their widths, while the double rack [bunn] *bun* pan is displayed along the length of the pan.

DETAILED DESCRIPTION OF THE INVENTION

In order to appreciate fully the inventive aspects of the improved wire rack, it is helpful to take a detailed look at some of the features of the racks used in the prior art.

In the fried chicken business, the food goes through several stages of preparation, including a frying stage and a display stage. In the frying stage, pieces of chicken are placed on wire racks and those wire racks are then placed in holding racks which are inserted into pressure fryers, as for example fryers made by the Henny Penny Corporation. The Henny Penny fryers, prevalent throughout much of the industry, cannot accommodate all types of racks. In order to be compatible with these fryers, the racks must fit into special holding racks which then fit into the pressure fryers. Racks previously designed specifically for the Henny Penny Pressure fryer are shown in FIG. 1. These racks 11 (hereinafter Henny Penny racks) are shown side by side in a double rack [bunn] *bun* pan 17. Each Henny Penny rack 11 has an upper border rod 29 and a lower border rod 31 in vertical alignment. In addition, each Henny Penny rack 11 has legs extending downwardly along the length of the lower border rod 31, formed by detents in the lower border rod 31 itself.

When two Henny Penny racks are removed from Henny Penny fryers, the racks 11 may be placed directly into a double rack [bunn] *bun* pan 17 (FIG. 1). The positioning of the rack legs 13 is such that the racks 11 may be positioned comfortably within the double rack [bunn] *bun* pan 17, with all legs 13 resting comfortably on the base 21 of the pan 17.

However, the Henny Penny rack 11 is not compatible with a single rack [bunn] *bun* pan 23 (FIG. 2). If an operator attempts to remove a Henny Penny rack 11 from a Henny Penny pressure fryer and place it directly into a single [bunn] *bun* pan 23 for *subsequently supporting or* displaying the fried food, the rack 11 simply will not fit. The reason for this problem is that the Henny Penny rack 11 is too wide for the single rack [bunn] *bun* pan 23. If the legs 13 along one side of the rack 11 are placed on the base 27 of the single rack [bunn] *bun* pan 23, the legs 13 on the other side of the rack 11 will rest on the side wall 25 of the pan 23, putting the rack 11 in a cocked and unstable position (FIG. 2).

Businesses within the food industry that use these frying systems have compensated for this rack-[bunn]*bun* pan incompatibility by using a separate rack for *subsequently supporting or* displaying foods in a single rack [bunn] *bun* pan. FIG. 3 illustrates such a *separate,* standard [display] rack 33 positioned in a single rack [bunn] *bun* pan 23. The display rack 33 has an upper border rod 41 and lower border rod 43 in vertical alignment with one another, similar to the upper border rod 29 and lower border rod 31 of the Henny Penny rack 11. The standard [display] rack 33 is able to fit into a single rack [bunn] *bun* pan 23 because of a few differences in rack design relative to the Henny Penny rack 11. The legs 39 on the [display] rack 33 are notably taller than the legs 13 on the Henny Penny rack 11. This increased leg height elevates the upper border rod 41 and lower border rod 43, preventing them from resting on the side walls 25 of the single rack [bunn] *bun* pan 23 (FIG. 3). Furthermore, the legs 39 are positioned significantly inward from the side walls 25 of the single rack [bunn] *bun* pan 23, and therefore are able to rest comfortably on the base 27 of the pan 23 (FIG. 3). Although the standard display rack 33 works well for *subsequently supporting or* displaying the food *in a single or double rack bun pan*, the rack 33 is incompatible with the holding racks of the Henny Penny pressure fryer. Therefore, when single rack [bunn] *bun* pans 23 are used to *support or* display food, the food preparer cannot simply take the Henny Penny rack 11 and place it in a single rack *bun* pan 23. Instead, the preparer must remove each one of the food items from the Henny Penny rack 11 and place them on the standard [display] racks 33. Furthermore, the business must stock two separate inventories of racks, one for frying and another for *supporting or* displaying.

The improved wire racks of this invention avoid these incompatibility problems, and are capable of being used in the Henny Penny fryer system as well as *in* both a double rack [bunn] *bun* pan and single rack [bunn] *bun* pan. Such an improved wire rack is shown in FIGS. 4, 5, and 6. The improved rack 51 has a rectangular frame 53 comprising a lower border rod 55 and an upper border rod 57. The lower border rod 55 defines a lower rectangular peripheral edge 59 and the upper border rod 57 defines an upper rectangular peripheral edge 61. The upper rectangular peripheral edge 61 has a larger circumference than the lower rectangular peripheral edge 59, with a means for defining tapered side walls 63 between the upper rectangular peripheral edge 61 and the lower rectangular peripheral edge 59. In a preferred embodiment of the invention, the side wall defining means comprises detents 65 formed in the upper border rod 57 and extending downwardly to contact the lower border rod 55. These detents 65 preferably are welded to the lower border rod 55.

In addition, the inventive rack 51 includes a plurality of support members 67 in the form of a plurality of parallel straight wires extending between and attached to opposed sides of the lower border rod 55 so as to create a support surface [of] *for* the food. In a preferred form of the invention, the support members 67 are wrapped about and welded to the opposed sides of the lower border rod 55 (FIG. 4). The wire rack 51 further includes legs 69 extending downward from the lower border rod 55. In one form of the invention, the legs may comprise detents 71 on the lower border rod 55. Alternatively, the legs 69 may comprise detents 71 formed in a plurality of parallel wires 73 extending between and attached to opposed sides of [said] *the* lower border rod 55 (FIGS. 4–6). Preferably, the parallel wires 73 are welded to the lower border rod 55.

In use, the improved wire rack 51 is compatible in all three operating environments. The rack 51 may be used in the Henny Penny fryer system because it dimensionally fits within the holding rack of the fryer. Furthermore, the inventive rack 51 may be used in both a double rack [bunn] *bun* pan 17 and a single rack [bunn] *bun* pan 23 (FIGS. 5 and 6). This versatility exists because of the tapered side walls 63 and the positioning of the legs 69. The tapered side walls 63 and legs 69 allow the rack 51 to rest squarely either in tandem with another rack 51 in a double rack [bunn] *bun* pan 17 or alone in a single rack [bunn] *bun* pan 32. In addition, the improved rack 51 offers this multiuse flexibility while supporting essentially the same amount of food as the prior art racks. This is so because the length and width of the upper border rod 57 of the wire rack 51 is substantially the same as the length and width of the upper border rod in both the Henny Penny rack 11 and the standard display rack 33 (FIGS. 1–6).

This invention is not limited to the description discussed above, but on the contrary, is intended to cover the various modifications and equivalent arrangements included within the spirit and scope of the appended claims.

What is claimed is:

1. A method of frying and displaying food, comprising the steps of:

a) placing said food on a wire rack, said wire rack including: a rectangular frame having a lower border rod and an upper border rod, said lower border rod defining a lower rectangular peripheral edge having a length and a width, and said upper border rod defining an upper rectangular peripheral edge having a length and a width, said upper rectangular peripheral edge having a larger circumference than said lower rectangular peripheral edge, thereby enabling said wire rack to be positioned respectively, in a stable, uncocked position, in a holding rack of a pressure fryer and as a sole rack in a single rack [bunn] *bun* pan and as one of a pair of said wire racks in a double rack [bunn] *bun* pan, said rectangular frame further including tapered sides between said upper rectangular peripheral edge and said lower rectangular peripheral edge; and a plurality of support members in the form of a plurality of wires extending between and attached to opposed sides of said lower border rod so as to create a support surface for the food;

b) positioning said wire rack in a holding rack of a pressure fryer;

c) frying said food in said pressure fryer;

d) removing said wire rack and fried food from said holding rack; and e) placing said wire rack in one of a single rack [bunn] *bun* pan and a double rack [bunn] *bun* pan for displaying the fried food.

*2. The method of claim 1 wherein the bun pan is a double rack bun pan, the method further including the step of placing a second wire rack next to said wire rack in the double rack bun pan.*

*3. The method of claim 2 wherein said second wire rack is identical to said wire rack.*

*4. The method of claim 3 wherein each of said racks is in an uncocked position.*

*5. The method of claim 1 wherein said food includes chicken.*

*6. A method of frying and subsequently supporting food, comprising the steps of:*

*placing said food on a wire rack, said wire rack including:*

*a rectangular frame having a lower border rod and an upper border rod, said lower border rod defining a lower rectangular peripheral edge having a length and a width, and said upper border rod defining an upper rectangular peripheral edge having a length and a width, said upper rectangular peripheral edge having a larger circumference than said lower rectangular peripheral edge, thereby enabling said wire rack to be positioned respectively, in a stable, uncocked position, in a holding rack of a pressure fryer and as a sole rack in a single rack bun pan and as one of a pair of said wire racks in a double rack bun pan, said rectangular frame further including tapered sides between said upper rectangular peripheral edge and said lower rectangular peripheral edge; and*

*a plurality of support members in the form of a plurality of wires extending between and attached to opposed sides of said lower border rod so as to create a support surface for the food;*

*positioning said wire rack in a holding rack of a pressure fryer;*

*frying said food in said pressure fryer;*

*removing said wire rack and fried food from said holding rack; and*

*placing said wire rack in one of a single rack bun pan and a double rack bun pan, thereby subsequently supporting said food.*

*7. The method of claim 6 wherein the bun pan is a double rack bun pan, the method further including the step of placing a second wire rack next to said wire rack in the double rack bun pan.*

*8. The method of claim 7 wherein said second wire rack is identical to said wire rack.*

*9. The method of claim 8 wherein each of said racks is in an uncocked position.*

*10. The method of claim 6 wherein said food includes chicken.*

* * * * *

UNITED STATES PATENT AND TRADEMARK OFFICE

CERTIFICATE OF CORRECTION

PATENT NO. : RE 37,147 C1
DATED : April 24, 2001
INVENTOR(S) : S. Alfred Svensson It is certified that error appears in the above-identified patent and that said Letters Patent is hereby corrected as shown below:

Title page,
Delete "Method for Heating and Subsequently Supporting or Displaying Food" and insert -- Method for Heating [Frying] and Subsequently Supporting or Displaying Food --.

Column 2,
Line 29, delete "as well as both a single" and insert -- as well as in both a single --.
Line 42, delete paragraph spacing.

Column 3,
Line 25, delete "for the Henny Penny Pressure fryer" and insert -- for the Henny Penny pressure fryer --.
Line 43, delete "into a single [bunn] bun pan 23 for" and insert -- into a single rack [bunn] bun pan 23 for --.
Line 57, delete "The display rack 33 has" and insert -- The rack 33 has --.

Column 4,
Line 5, delete "Although the standard display rack 33 works well for" and insert -- Although the standard [display] rack 33 works well for --.
Line 60, delete "bun pan 32" and insert -- bun pan 23 --.
Line 66, delete "Standard display rack 33" and insert -- standard [display] rack 33 --.

Signed and Sealed this

Fourth Day of December, 2001

*Attest:*

Nicholas P. Godici

*Attesting Officer*

NICHOLAS P. GODICI
*Acting Director of the United States Patent and Trademark Office*